March 13, 1962  LE ROY M. OSBORNE  3,024,923
METHOD AND APPARATUS FOR FORMING ARCHES IN STORAGE STRUCTURES
Filed Sept. 9, 1959
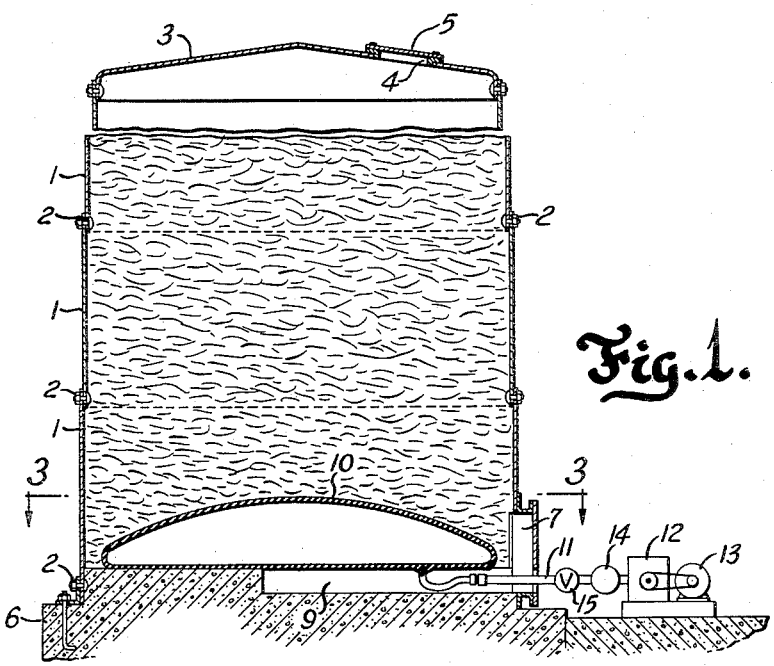
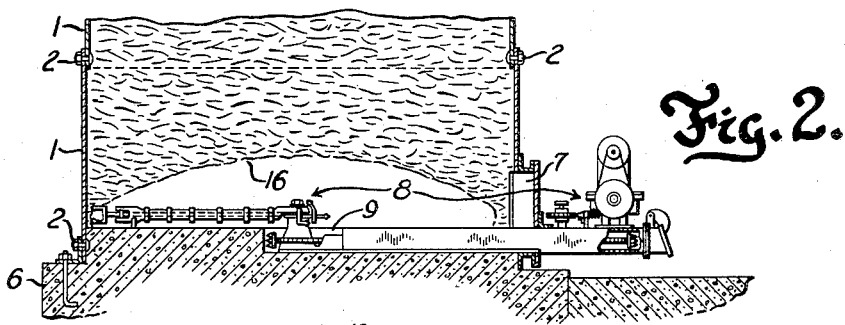
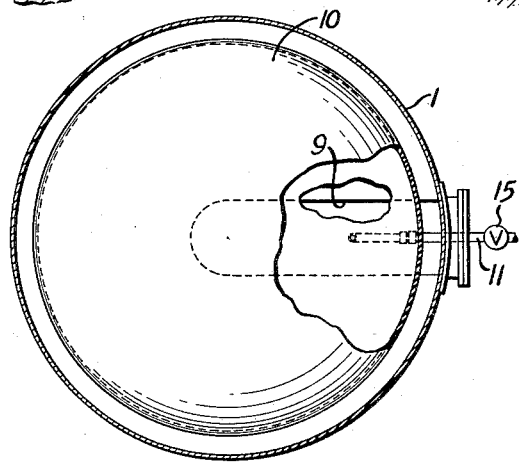
INVENTOR.
LeRoy M. Osborne
BY
Attorneys

United States Patent Office 3,024,923
Patented Mar. 13, 1962

3,024,923
METHOD AND APPARATUS FOR FORMING ARCHES IN STORAGE STRUCTURES
Le Roy M. Osborne, Kankakee, Ill., assignor, by mesne assignments, to A. O. Smith Harvestore Products, Inc., Kankakee, Ill., a corporation of Delaware
Filed Sept. 9, 1959, Ser. No. 838,918
4 Claims. (Cl. 214—17)

This invention relates generally to unloading material which is stored in a storage structure, and particularly to a method and apparatus for forming an arch in the bottom of a column of stored material to facilitate the entry and operation of an unloading mechanism.

When fibrous material such as silage is loaded into a storage structure or a silo it tends to compact at the bottom and becomes of maximum density due to the pressure caused by its columnar weight.

Unloading silage from the bottom of a silo equipped with a bottom unloader is facilitated if the silage arches closely adjacent and above the bottom unloader so that the weight of the silage column does not bear directly on the cutter arm of the unloader.

This invention is directed to establishing planned arches or cavities at the bottom of a column of stored fibrous material prior to commencement of the unloading operation by employing a pneumatic arch or cavity forming device, so that the silage will flow downwardly toward an unloading mechanism at a substantially even rate of flow. By forming an arch of proper diameter, the remaining narrow ring of silage located adjacent the silo wall will not be able to support the weight of the silage column and thus the silage will crumble and flow down to the unloader.

The use of this pneumatic arch or cavity forming device makes it possible to form an arch or cavity prior to the loading of a storage structure thereby supplanting the time consuming and cumbersome method of installing a bottom unloader equipped with a short arm to initially establish an arch of small radius removing the unloader, replacing the short arm with a longer arm to establish an arch of larger radius, re-installing the unloader, and continuing this procedure until an arch of desired radius has been formed.

This invention, instead, employs an inflatable pneumatic bag disposed on the floor of a storage structure in such a manner that a cavity of the desired radius and height will result on inflation of the bag by means of a suitable compressor, equipped with a pressure regulator and a valve for deflation of the bag.

The bag is inflated to a pressure sufficient to withstand the anticipated load of material to be stored in the structure. When loading of the storage structure has been completed and the bottom unloading apparatus is ready to be installed, the bag is deflated and removed from the structure through the unloader trough. Upon removal of the bag the cavity in which it was disposed remains due to the natural budging or arching characteristics of the silage or other fibrous material. The bottom unloading apparatus is then installed with a cutter arm prepared for normal use and may operate immediately upon installation without the hinderance of pressure on the cutter arm caused by the weight of the stored material. The stored material while maintaining this cavity will continue to flow downwardly and outwardly toward the structure walls forming a small width of stored material between the end of the cutter arm of the unloader and the bottom of the storage structure wall whereby the cutter arm may act to easily and continuously cut and remove the material.

Other objects and advantages of the invention will appear in the course of the following description.

The drawings furnished herewith illustrate the best mode presently contemplated of carrying out the invention as set forth hereinafter.

In the drawings:

FIGURE 1 is a vertical sectional view of a storage structure, with parts broken away, and showing an inflated flexible bag;

FIG. 2 is a view similar to FIGURE 1 but showing the arch or cavity remaining after deflation and removal of the pneumatic bag and the bottom unloading apparatus in operation position; and FIG. 3 is a view taken along line 3—3 of FIGURE 1.

The drawings illustrate a cylindrical storage structure such as a silo which comprises a plurality of cylindrical sections 1 joined together at joints 2. The joints are sealed with a mastic or cement impervious to air or moisture. The silo is provided with a roof 3 having an opening 4 extending therethrough so that silage or other fibrous materials may be loaded into the silo. The opening is provided with an air tight cover 5 which is kept in place when the silo is not being filled.

The silo is secured to a foundation 6, preferably made of concrete, which provides a floor for the structure. The lowermost cylindrical section 1 of the silo is provided with an opening 7 for the insertion and withdrawal of unloading apparatus 8 into trough 9 which extends from the wall of the silo to substantially the center of the foundation. The unloading apparatus 8 is substantially similar to that disclosed in Patent No. 2,635,770 and assigned to a common assignee with the present invention.

To establish an arch in the fibrous material to be loaded into the silo, a flexible bag 10 of a material impervious to air and liquid is disposed centrally on the floor of the cylindrical storage structure on foundation 6.

As is best seen in FIG. 3, when inflated, the vertical axis of flexible bag 10 is disposed centrally on foundation 6 of the storage structure and has a generally circular transverse configuration. The bag is inflated so that its radius is smaller than the radius of cylindrical section 1 at foundation level. This predetermined radial differential provides a circumferential ring defined by the outer edge of bag 10 and the inner surface of cylindrical section 1. The width of this ring is determined according to the size of the storage structure and the type of unloading apparatus.

FIGURE 1 best illustrates that inflated flexible bag 10 is generally convex in vertical configuration. The bottom wall of the bag 10 is generally flat and is disposed on the correspondingly flat surface of foundation 6.

To inflate the bag, a fluid line 11 extends from the bag through trough 9 and is connected to a compressor 12 which is driven by a motor 13. A pressure regulator 14 and valve 15 are connected in line 11. The pressure regulator 14 serves to maintain a predetermined pressure in the bag and the valve 15 functions to discharge the fluid to the atmosphere when deflating the bag.

Bag 10 is initially located upon the foundation 6 and inflated in a manner such that a desired radius and height of the arch or cavity will be obtained. Following proper location and inflation of flexible bag 10, the storage structure is loaded in the usual manner. Upon completion of the loading operation, bag 10 is deflated and withdrawn from the storage structure through trough 9.

The arch or cavity 16 resulting from the withdrawal of the deflated bag is best seen in FIG. 2 which illustrates the bottom unloading apparatus 8 disposed in operating position.

During operation of unloading apparatus 8, the stored material disposed above the arch or cavity flows freely downward at a substantially uniform rate. This has been accomplished by employing the arch or cavity forming device which acts to eliminate the resistance to free downward passage of stored material by providing a cavity or arch at the base of the storage structure. This cavity or arch causes the column of stored material to be supported by only a relatively narrow circumferential ring of stored material disposed between the inner surface of cylindrical section 1 and outer edge of cavity 16 at the bottom of the storage structure.

Various modes of carrying out the invention are contemplated as being within the scope of the following claims particularly pointing out and distinctly claiming the subject matter which is regarded as the invention.

I claim:

1. The method of forming an arch in the lower portion of a column of fibrous material disposed in a storage structure for unloading said material from the structure, comprising inserting a collapsible member into the lower portion of the storage structure, expanding the collapsible member while disposed therein to form a convex temporary structure in the lower portion of said storage structure, filling the storage structure with a column of fibrous material while the collapsible member is expanded to form a concavity in the lower portion of the column and providing an arch of the fibrous material immediately above said concavity, collapsing said collapsible member while retaining the arch formed in the fibrous material by said member, removing said collapsible member from the storage structure, disposing a bottom unloading device in the lower portion of the storage structure in the concavity formed by said collapsible member, actuating said unloader to convey away the lower peripheral portion of said column of fibrous material supporting said arch, and simultaneously maintaining the arching of the material above said concavity due to the flow characteristics of the fibrous material.

2. The method of forming a concavity in the lower portion of a column of fibrous material disposed in a storage structure having a foundation, comprising inserting a deflated inflatable member into the lower portion of the storage structure, said inflatable member having a diameter which is less than the inside diameter of said storage structure, inflating the inflatable member, filling the storage structure with a column of fibrous material while the inflatable member is centrally disposed in the lower portion of the storage structure in inflated condition, said column having an arched bottom portion defining a concavity formed by the said inflatable member and having a peripheral portion of fibrous material surrounding said concavity and supporting said column on the foundation of the storage structure, deflating said inflatable member without changing the configuration of said concavity, removing said inflatable member from the storage structure, disposing a bottom unloading device in the lower portion of the storage structure in the concavity formed by said inflatable member, and actuating said unloader to convey away the peripheral portion of said column of fibrous material while maintaining an arch of continuously changing fibrous material immediately adjacent said concavity.

3. Apparatus for storing and unloading a fibrous material comprising in combination, a storage structure including a base portion having an opening therein for unloading the structure, a vertical wall portion, and a roof portion with an opening therein for filling the structure, a collapsible member having a convex upper surface disposed in the base portion, said collapsible member being adapted to collapse for insertion into, and removal from the storage structure through the opening in said base portion, and a fibrous material disposed in and contained by said storage structure, said fibrous material defining an arch over said collapsible member which is retained during subsequent unloading due to the flow characteristics of the fibrous material, after removal of the collapsible member.

4. Apparatus for storing silage comprising in combination, a cylindrical silo having top and bottom openings, a base portion, a vertical wall portion, and a roof portion, a hemispherical inflatable member having a diameter less than the diameter of the silo when inflated disposed in the base portion of said silo and in the inflated condition and adapted to be deflated and removed through the bottom opening in the silo, and a column of silage disposed in said silo and covering said inflatable member to define a stable arch of silage over the inflatable member, said arch being retained by the flow characteristics of the silage after removal of said inflatable member and during subsequent bottom unloading of said silo.

References Cited in the file of this patent

UNITED STATES PATENTS

| | | |
|---|---|---|
| 2,270,229 | Neff | Jan. 20, 1942 |
| 2,311,358 | Baily | Feb. 16, 1943 |
| 2,324,554 | Billner | July 20, 1943 |
| 2,624,931 | Billner | Jan. 13, 1953 |
| 2,892,239 | Neff | June 30, 1959 |